United States Patent [19]

McFalls

[11] Patent Number: 5,003,676
[45] Date of Patent: Apr. 2, 1991

[54] YARN END SPLICING APPARATUS

[76] Inventor: San M. McFalls, 1830 Beechwood Blvd., Gainesville, Ga. 30501

[21] Appl. No.: 500,929

[22] Filed: Mar. 29, 1990

[51] Int. Cl.$^5$ .......................... D03J 1/18; B65H 69/08
[52] U.S. Cl. ...................................... 28/209; 156/158; 156/379.8; 156/433; 156/502
[58] Field of Search ............... 28/209; 156/158, 379.8, 156/433, 502

[56] References Cited

U.S. PATENT DOCUMENTS

| | | | |
|---|---|---|---|
| 3,616,054 | 10/1971 | Williams | 156/158 X |
| 3,695,975 | 10/1972 | Williams | 156/158 X |
| 3,741,836 | 6/1973 | Williams | 156/158 |
| 3,793,117 | 2/1974 | Brooks | 156/433 |

FOREIGN PATENT DOCUMENTS

| | | | |
|---|---|---|---|
| 2450018 | 4/1976 | Fed. Rep. of Germany | 156/158 |
| 1206458 | 9/1970 | United Kingdom | 156/502 |

*Primary Examiner*—Werner H. Schroeder
*Assistant Examiner*—Bradley Kurtz DeSandro
*Attorney, Agent, or Firm*—Kerkam, Stowell, Kondracki & Clarke

[57] ABSTRACT

An apparatus for thermally splicing a plurality of associated pairs of yarn ends employed in tufting carpet is provided, having an electrically conductive wire extending across a width of a beam of yarn ends as a heating element, the wire being biased in tension between a pair of springs attached to the wire and to terminal mounted on a bracket member. A yarn end spacing and gaging bar is also mounted to the bracket to retain the associated pairs of yarn ends in a contacting relation in recesses disposed between teeth on the bar, the pairs of yarn ends being made up of yarn ends severed from a spent beam of yarn and associated yarn ends from a fresh beam of yarn. The apparatus maintains the heating element in a substantially fixed position with respect to the plurality of associated pairs of yarn ends to effect a substantially simultaneous heating and melting together of the pairs of yarn ends, and is preferably removably mounted to a beam rack holding the fresh beam.

23 Claims, 5 Drawing Sheets

YARN END SPLICING APPARATUS

BACKGROUND OF THE INVENTION

1. Field of the Invention

The present invention relates to an apparatus employed to splice together a plurality of yarn ends in a tufting operation.

2. Description of Related Art

A drastic need has existed for some time in the carpet tufting industry for an efficient and rapid means for splicing yarn, particularly thermoplastic yarn, employed in tufting machines. In the tufting of modern carpet, up to thirty or more beams of yarn are being fed continuously to the tufting machine needles and each beam of standard length, such as five feet, may contain as many as one hundred and fifty individual yarn ends. The beams of yarn are customarily mounted on racks and arrangements of three, four or five beams per rack are utilized as discussed in, for example, U.S. Pat. No. 3,616,054. Inevitably, the beams become exhausted or spent after a period of usage and the ends of yarn on a full beam must be carefully spliced with a corresponding number of yarn ends trailing from the carpet, which trailing ends have been severed from the exhausted or substantially exhausted beam, prior to its removal from the rack.

In the splicing of the yarn ends, knots or enlargements made in splicing are highly disfavored since these will generally not pass through the eyes of the tufting machine needles. It had been customary to splice all of the ends coming from a fresh beam with a corresponding number of ends trailing from the tufted carpet by a tedious and laborious hand splicing process which consists of applying latex cement to the individual ends being spliced. This is a disastrously slow process which causes excessive down time for the tufting machine whenever a beam splicing operation is required.

In the above-mentioned U.S. Pat. No. 3,616,054 and in U.S. Pat. No. 3,695,975, an improvement over the latex cement hand splicing operation is disclosed wherein means are provided to thermally splice ends of yarn from a fresh beam with the trailing ends of the yarns extending from the carpet being tufted, these trailing ends having been separated or severed from a spent beam. The ends to be spliced together are aligned and held together, and a movable heating element or unit is propelled, either by hand or by motor propulsion, across the span of plurality of yarn ends being spliced. The desired outcome of this process is to fuse together the ends from the spent beam with the associated ends from the fresh beam.

A splice made by thermal splicing has the potential to be especially strong and to have no objectionable enlargements to interfere with the needle eyes of the tufting machine. However, experience over the years has shown that heating elements of the type described in U.S. Pat. Nos. 3,616,054 and 3,695,975, have not provided an acceptable level of reliability or consistency in effecting the thermal splices, and have been the cause of excessive downtime in the tufting operation. One suspected cause of the lack of reliability and lack of consistency in the splices is that heat is not always uniformly applied to all of the plurality of yarn ends being spliced.

Thus, a requirement continues to exist in the art to provide an apparatus for fast, reliable and consistent beam splicing, so as to minimize the down time of the tufting machine while new beams are being spliced in.

It is a principal object of the present invention to provide a splicing apparatus which more rapidly, reliably and consistently splices a plurality of trailing yarn ends being fed to the tufting mechanism to corresponding yarn ends on a replacement beam.

It is another important object of the present invention to provide a simplified thermal splicing apparatus wherein the yarn ends of an entire beam may be spliced substantially simultaneously with the trailing ends of the spent beam.

It is a further important object of the present invention to provide a thermal splicing heating element which is of simple construction and has high reliability.

SUMMARY OF THE INVENTION

The above and other objects of the present invention are accomplished by providing a yarn end splicing apparatus which is adapted to be mounted directly to a rack holding a plurality of beams in a manner similar to that shown and described ind U.S. Pat. No. 3,695,975, but which replaces the heating element and heating element carriage disclosed in that patent with a full beam width heating element.

The heating element of the present invention is of a much simpler and less costly design, and has also been proven to produce more reliable and consistent splicing, resulting in reduced down time when new beams are spliced in. The reduced downtime is of great benefit in that far greater quantities (square yards) of carpet may be tufted in a given period, such as one labor shift.

The heating element employed in the present invention is a single electrically conductive wire extending across the entire width of a beam to be spliced, the wire being suspended between two springs attached to mounting bolts on a mounting bracket. The plurality of pairs of yarn ends are retained in side-by-side contacting relation with each other and with the heating element, and when current is applied to the heating element, the heat generated in the wire locally heats and melts the yard ends to fuse the pairs of ends to one another. The spliced ends are then released from the retaining means and the operation of the tufting machine continues with the fresh beam ends being fed to the tufting needles.

The use of the single wire, full beam width heating element greatly improves the consistency of the quality of the splices, as well as the speed of the splicing process. The wire heating element also provides improved reliability over the relatively complex heating elements disclosed in the above-mentioned patents.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views.

DETAILED DESCRIPTION OF THE INVENTION

Figure 1:
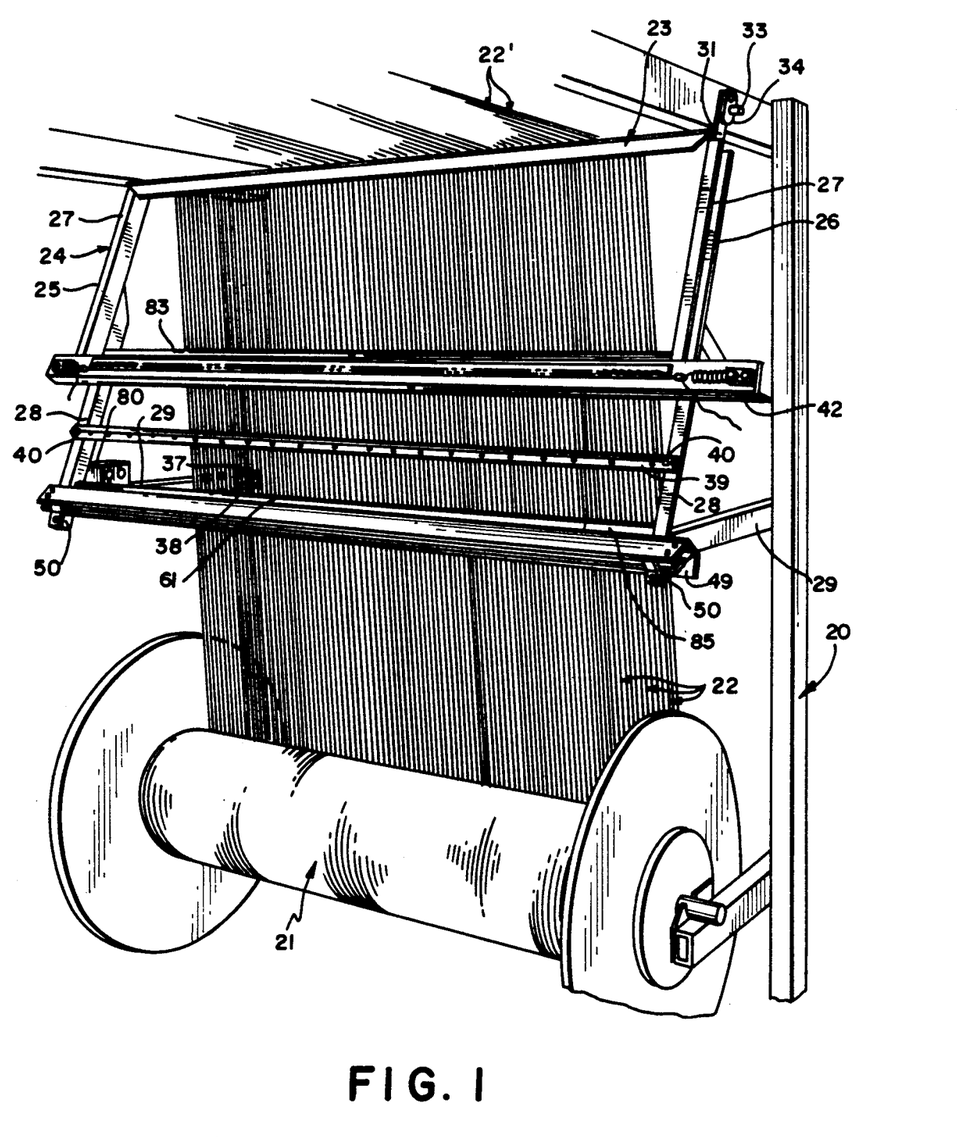
FIG. 1 is a perspective view of a yarn splicing apparatus embodying the invention mounted upon a beam rack near a tufting machine with the splicing carriage and other components of the apparatus removed and showing the apparatus in association with a substantially spent beam about to be replaced by a full beam.

Referring now to the drawings, wherein like numerals designate like parts throughout, there is shown in FIG. 1 a fragmentary portion of a rack 20 for yarn beams as it would be positioned near the yarn inlet end of a carpet tufting machine. For convenience of illustration, only a single beam 21 is shown removably mounted on the rack 20 in a substantially exhausted or diminished state. It will be understood by those skilled in the art that a number of beams, such as three or five, may be mounted on the same rack in a particular arrangement and that several racks of beams positioned in a side-by-side manner may be employed to feed a large number of yarn ends simultaneously to the needles of the tufting machine (not shown), which tufting machine may be capable of tufting carpet as wide as sixteen feet. For convenience, the yarn splicing apparatus embodying the invention will be explained in connection with the fragmentary and incomplete beam rack arrangement depicted in FIG. 1 as this depiction will be sufficient for a proper explanation of the invention for those of ordinary skill in the art to be able to practice the invention.

As indicated in FIG. 1, the individual yarn ends 22 wound on the nearly depleted beam 21 are normally fed upwardly through openings in a guide bar or header 23 on the top of the rack 20. From this point, the web of yarn ends extends in a forward direction, as at 22', and the yarn ends further engage conventional guide tube means (not shown), which guide the yarn to the tufting needles, again, it being understood that only a single beam is illustrated and that many such beams may simultaneously be delivering yarn to the tufting machine. A typical beam 21 may be about five feet in axial length with about one hundred fifty individual yarn ends wound thereon.

Figures 2A, 2B, 2C, 3, 7, 9:
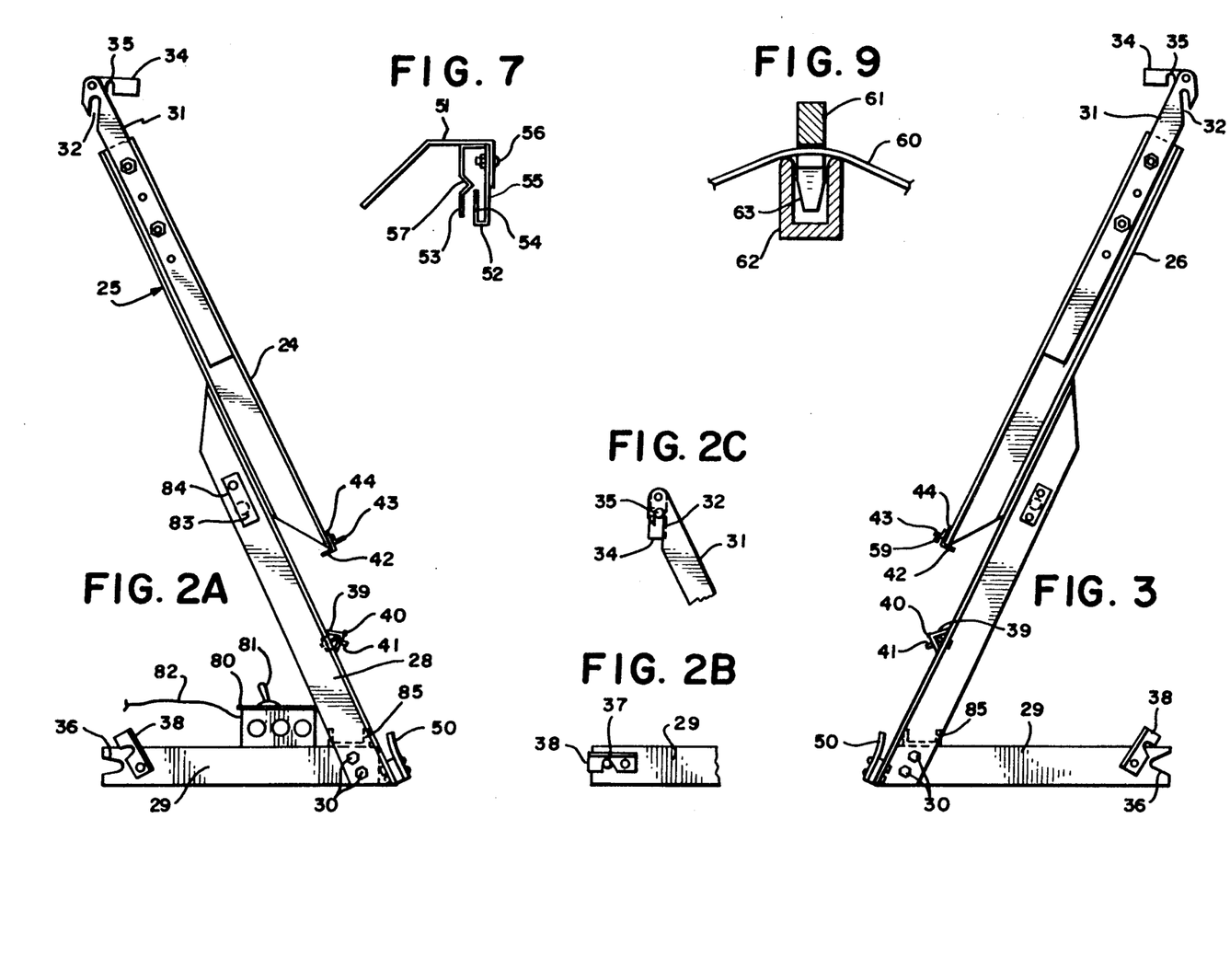
FIG. 2A is a side elevational view of the apparatus generally as depicted in FIG. 1 with the beam rack omitted.
FIG. 2B is a fragmentary elevational view of a lower frame latch in the active locking position.
FIG. 2C is a similar view of an upper frame latch.
FIG. 3 is a side elevational view of the apparatus looking at the opposite end from FIG. 2A of the apparatus frame.
FIG. 7 is an enlarged transverse vertical section taken on line 7—7 of FIG. 6.
FIG. 9 is a transverse vertical section through the FIG. 8 element in assembled relationship.

The frame of the splicing apparatus, indicated generally by number 24, is designed in width to accommodate a typical or standard length beam, it being understood that in some special cases the frame may be of larger or smaller width. The frame 24 is preferably formed of lightweight structural aluminum and consists very simply of two generally L-shaped frame ends 25 and 26, each having an upwardly and rearwardly inclined, preferably two-part, frame bar consisting of members 27 and 28 which are rigidly joined at an overlap. The frame ends 25 and 26 also include horizontal rearwardly extending brace bars 29 rigidly connected to the lower ends of the members 28 as by bolt means 30 (FIGS. 2A and 3). Quick release latch means are provided on the tops of the members 27 and the rear ends of the bars 29 to detachably secure the entire frame 24 to the beam rack 20. The latch means comprises arm extensions 31 on the members 27, these extensions having downwardly opening slots 32 adapted to engage fixed suspension pins 33 projecting from the sides of the rack 20 at a top portion thereof. In effect, the extensions 31 hook over these suspension pins. Pivoted keepers 34 on the extensions 31 have locking slots 35 which engage the pins 33 and lock the apparatus frame thereto safely when swung down to the position shown in FIG. 2C. In a similar manner, the rear ends of brace bars 29 are slotted at 36 to receive inwardly projecting pins 37 on the uprights of the rack 20 and pivoted keepers 38 on the bars 29 swing downwardly and engage over the pins 37, FIG. 2B, to complete the locking of the frame 24 to the rack 20 securely.

An angle bar 39 extends transversely across the front of the frame 24 and structurally ties together the two frame ends 25 and 26, being bolted thereto at 40. The angle bar 39 is equipped on and its forward side with a row of equidistantly spaced pins 41, the purpose of which will be described later.

Figure 4:
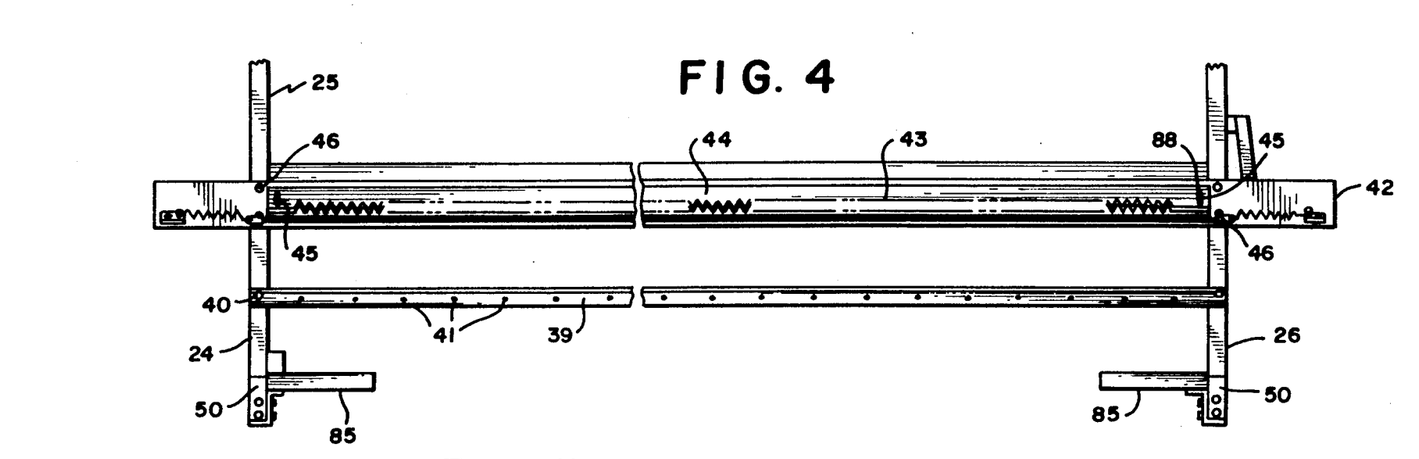
FIG. 4 is a front elevational view of the apparatus.
Figure 5:
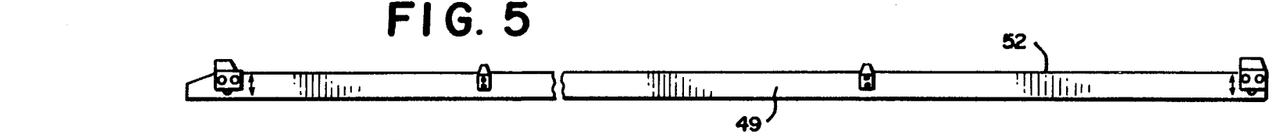
FIG. 5 is a plan view of a detachable yarn gaging or clamping bar.
Figure 6:
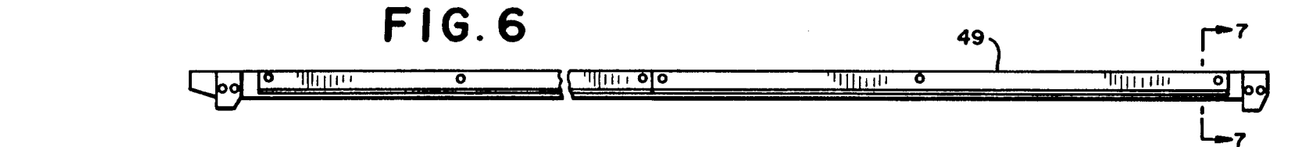
FIG. 6 is a bottom plan view of the detachable yarn gaging or clamping bar.
Figure 13:
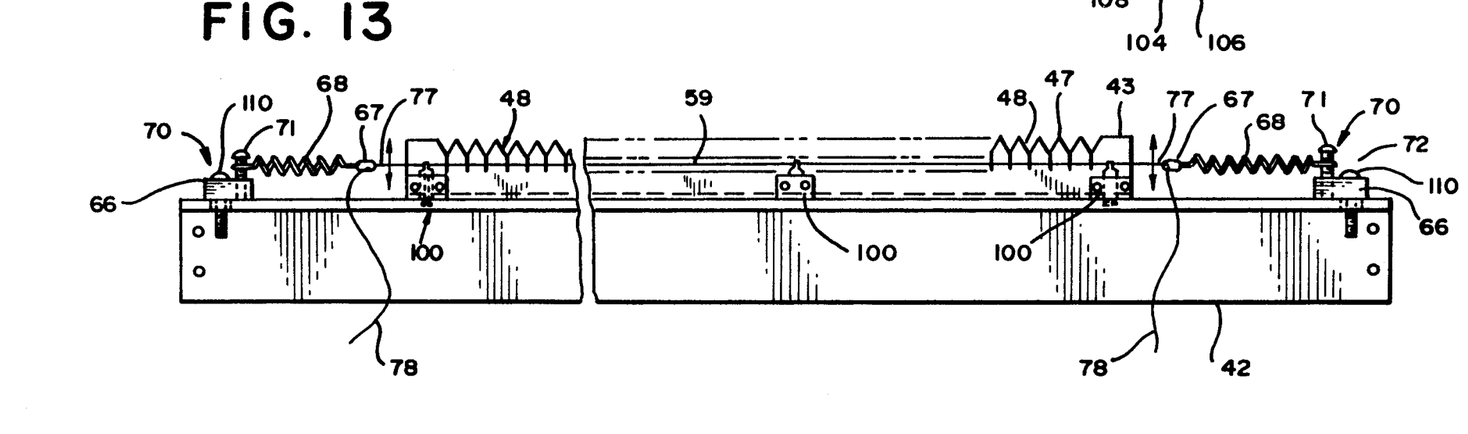
FIG. 13 is a side view of the splicing bar.

Looking now also to FIG. 4, above the bar 39 and parallel thereto is an important component of the apparatus in the form of an angle bar bracket 42 having disposed thereon a forward projecting yarn spacing and gaging bar 44, which is attached to angle bar 42 by bolts 45. The angle bar 42 extends between the two frame ends 25 and 26 and is bolted to the arms or members 27 thereof at 46. Yarn spacing and gaging bar 44 has a toothed engaging edge 43 having a multiplicity of closely spaced tapered teeth 47 defining between them tapered yarn engaging recesses or sockets 48 (FIG. 13). Each socket is adapted to receive therein in side-by-side or over-and-under contacting relation a single pair of yarn ends to be spliced, one of the yarn ends having been severed from the spent beam, and the other being an associated yarn end from the fresh beam. Sufficient teeth 47 and recesses or sockets 48 are provided to receive all of the yarn ends from a single fresh beam and a corresponding number of trailing ends from the tufting machine to be spliced to the ends of the fresh beam.

A coacting yarn clamp bar assembly 49 (FIGS. 5, 6, 7, 10, 11), completely separable from the rest of the apparatus is provided. While not in use (FIG. 1), this assembly 49 may be stored in holder brackets 50 provided at the lower front of the frame 24. As can best be seen in FIG. 7, the clamp bar assembly 49 comprises a main clamp body 51 having a frontal straight yarn clamping edge formed by spring clamp 52. This assembly additionally comprises a lower clamping plate 53 and a coacting upper clamping plate 54 both coextensive with plate 55 which assembly of coacting and substantially coextensive plates comprise a spring clamp when properly formed as shown. The spring clamp 52 is adjustably secured to the main yarn clamp body 51 by bolts 56. Additionally, the lower spring clamp plate 53 has a dimple 57 throughout its length which provides a stop when the clamp is affixed to the forward projecting yarn spacing and toothed gaging edge 43 of the yarn spacing and gaging bar 44.

Figure 11:
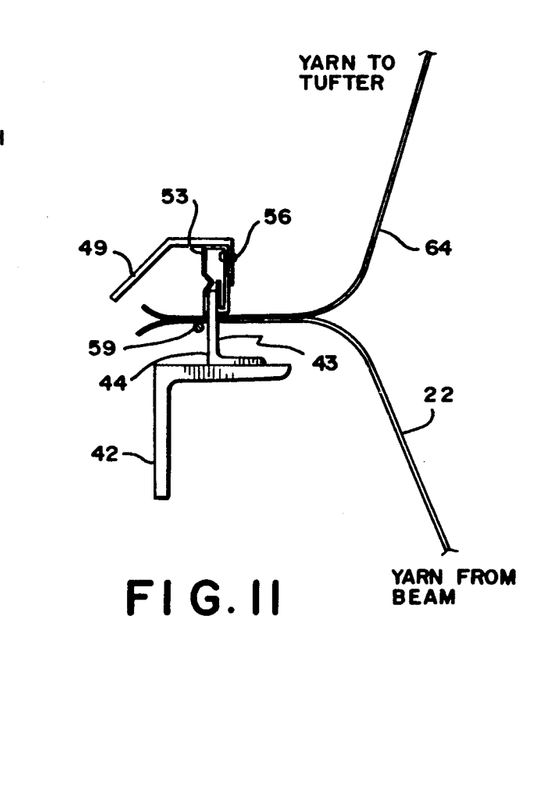
FIG. 11 is a side view of the splicing bar showing the relationship of the yarns, yarn guide and clamping bar assembly.

The dimple stop 57 on the spring lower clamping plate 53 is designed such that when the coacting yarn clamp bar assembly 49 is installed on the yarn spacing gaging bar 44, as best shown in FIG. 11, the yarn ends 22 and 60 are firmly held against the heating element 59, an important part of the invention which will be discussed later.

Figure 8:
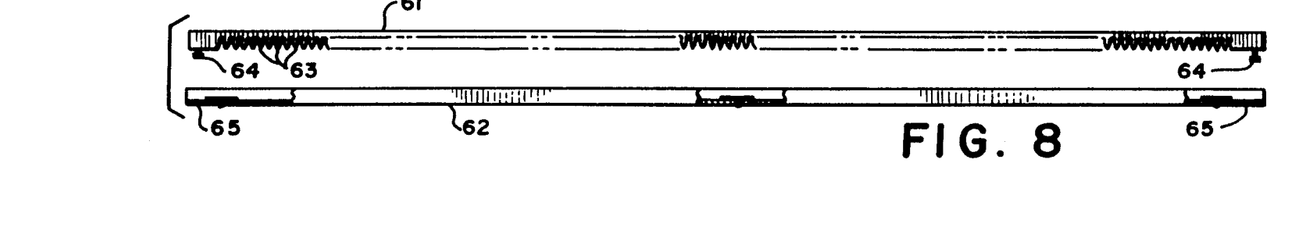
FIG. 8 is a composite elevational view of a two-part yarn clamp including a combing bar and channel.
Figure 10:
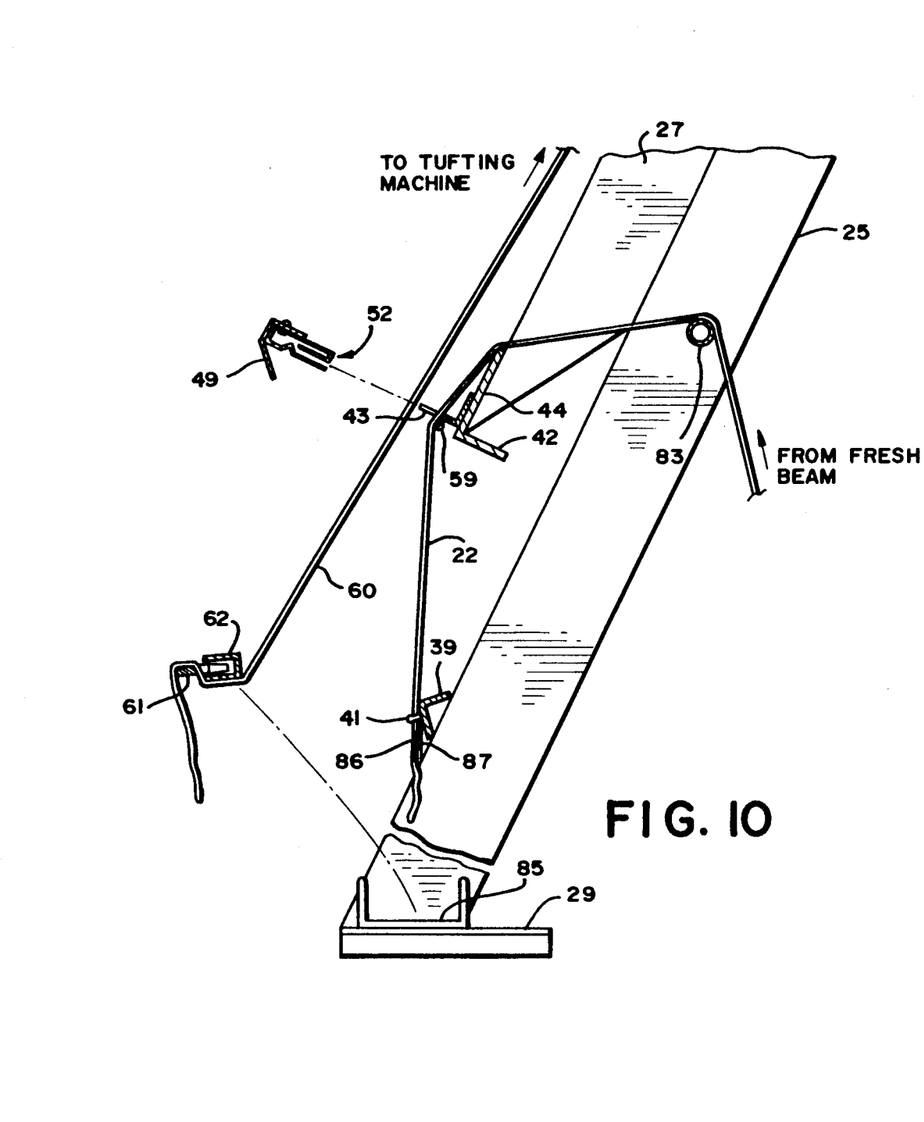
FIG. 10 is a fragmentary vertical cross sectional view through the apparatus showing the disposition of sets of yarn ends trailing from the tufting machine and extending from a fresh beam as they are about to be clamped and engaged in pairs prior to splicing.

The apparatus further embodies an aid to manipulate and properly space the yarn ends 60 which trail from the tufting machine after being severed from an exhausted beam 21. This aid or device is a separate assembly shown particularly in FIGS. 8 and 9 consisting of two parts, namely, a combing bar 61 and a channel-shaped clamping bar 62. The combing bar 61 has teeth 63 and intervening notches in sufficient numbers to engage all of the yarn ends of a beam, such as beam 21. The spacing of the teeth and notches on the combing bar are the same as the spacing of the recesses 48 in the gaging edge 43 of the clamp bar assembly. Near its opposite ends, the combing bar 61 carries beaded pins 64 engagable within end slots 65 in the clamping bar 62 so that the two members may be secured in interfitting or clamping relationship as shown in FIGS. 9 and 10. The use of this two-part assembly or device will be further clarified when the operation of the invention is described.

Figures 12, 14:
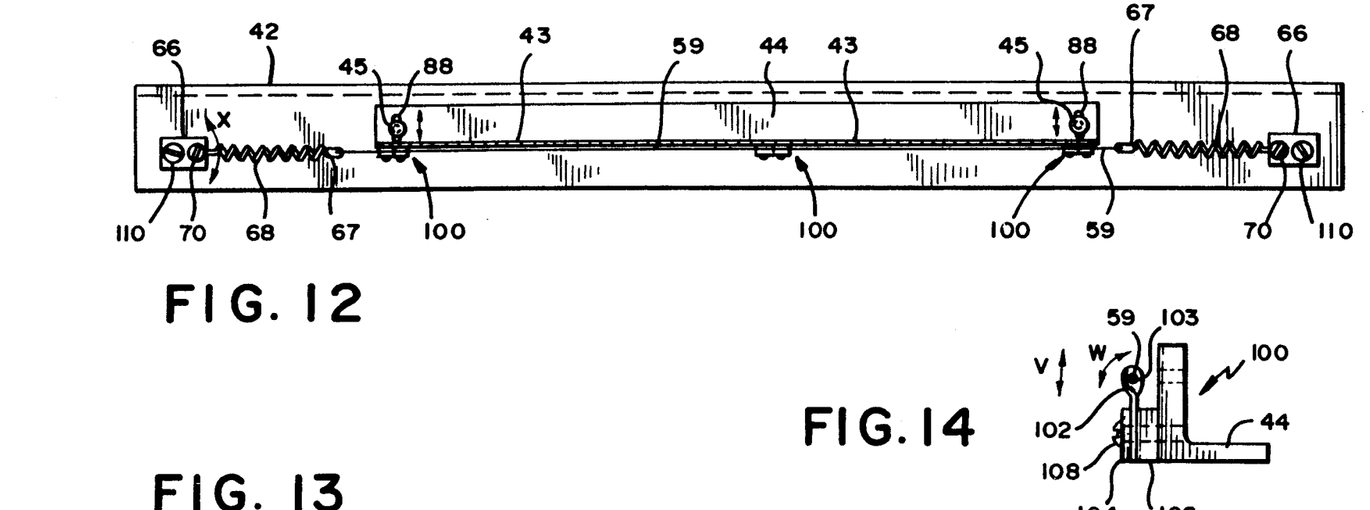
FIG. 12 is a top plan of the splicing bar showing the relationship of the yarn guide and heating element.
FIG. 14 is a side view of the heating element support assembly according to a preferred embodiment of the present invention.

Turning now especially to FIGS. 12 and 13, a heating element 59 is shown which is held fixedly in place in relation to the gaging edge 43 of the yarn spacing and gaging bar 44 during the splicing operation by insulating terminals or blocks 66, spring 68, spring terminals 70 and a plurality of heating element support assemblies 100 in a cooperating relationship which will be further described. The heating element 59 is an electrically conductive wire which is of a length sufficient to exceed the length of the spacing and gaging angle bar 44 by an amount sufficient to ensure that all of the yarn pairs being held by yarn engaging recesses 48 will come in contact with or be positioned in close proximity to or adjacent to the heating element.

The heating element is held at both ends by fixedly attaching it to a wire fastening means 67 which may be a nut and bolt fastener for example. The fastening means 67 are also connected to the springs 68 at the ends of the bar. The heating element is thus further held stationary and taut throughout the splicing cycle by the springs 68 at both ends of the heating element, the springs being attached to the heating element 59 through the wire fastening means 67. At a distal end of each spring 68, spring terminal 70 preferably comprises a height adjustment post 71, provided in the depicted embodiment in the form of bolts 72 threaded into bores tapped in insulating terminals or blocks 66. The bolts may be raised and lowered in the bores to raise or lower the height of the heating element 59, as desired. The springs 68 serve a most important purpose for the apparatus in that the springs are initially extended when attached between heating element 59 and terminal 70, and the spring force will cause the springs to contract as the heating element thermally expands, thus keeping the heating element taut and fixed in position in relation to the yarn ends 60 and 22, best shown in FIGS. 11, 12, and 13. Stated another way, the springs provide a biasing or tension force on the wire which keep the wire taut when thermal expansion of the wire takes place.

Referring now to FIG. 14 in combination with FIGS. 12 and 13, another important aspect of the present invention will be described. In order to ensure that each pair of yarn ends is properly spliced, it is important to maintain the heating element 59 in its proper desired location across the entire width of the splicer. The biasing force of springs 68 aids in counteracting the effects of thermal expansion of the heating element. In addition, a plurality of heating element support assemblies 100 are preferably disposed at spaced apart locations along the length of the heating element 59. Three such assemblies are shown in the preferred embodiment of FIGS. 12 and 13.

The support assembly comprises a guide member 102 having a hole 103 therein of a diameter sufficient to allow heating element 59 to extend therethrough. As shown in the preferred embodiment in FIG. 14, the guide member 102 is made of a relatively thin piece of sheet metal which is twisted at about 90° at a middle portion thereof. The guide member is retained in position between a pair of clamping members 104, 106, which are made of an electrically insulating material. The clamping members 104, 106, with guide member 102 sandwiched therebetween are secured to yarn spacing and gaging bar 44 by a pair of screws 108 extending through the clamping members and bar 44. Guide member 102 is preferably of a width which will allow the screws 108 to pass by on either side of the guide member without coming into contact therewith. The guide member will thus not be in contact with any electrically conductive material except the heating element itself. It should be recognized that other means may be employed for retaining the guide member in position, and that the depicted embodiment is shown for illustrative purposes only.

The construction of assembly 100 allows the heating element 59 to be precisely positioned in that guide members 102 may be raised or lowered (arrow V, FIG. 14) as necessary to ensure proper vertical positioning of the heating element with respect to the yarn engaging recesses 48. In adjusting the vertical positioning, screws 108 need only be loosened, guide member 102 be moved up or down, and the screws may then be retightened to retain the guide member in position. The spring terminals 70 at the ends of the heating element may also be adjusted accordingly when the guide member adjustments are made.

Assembly 100 also permits the distance between the heating element 59 and bar 44 to be adjusted to a desired spacing. In making adjustments of this type, guide members may simply be bent toward or away from bar 44 (arrow W, FIG. 14) moving heating element 59 accordingly. In order to facilitate this type of adjustment, insulating terminal blocks 66 are preferably pivotably mounted (arrow X, FIG. 12) to bracket 42 by bolt 110. Thus when guide members 102 are bent either toward or away from bar 44, blocks 66 are permitted to move in a similar direction, as necessary.

In addition to the adjustment mode described above, and looking now especially to FIG. 12, it can be seen that the spacing distance between heating element 59 and the yarn spacing and gaging bar 44 may be adjusted in a different manner, as bar 44 is provided with oval slots 88, which permit movement of the bar toward or away from heating element 59 when bolts 45 are loosened. Such adjustment would not normally be performed during the heating portion of the splicing operation, rather, the adjustment would be generally made when particular conditions would require the bar to be closer to or further away from the heating element. The bar 44 would in any event be locked into position by bolts 45 prior to introducing yarn ends into the recesses 48 in the bar.

The heating element wire ends are connected by power leads 78 to a suitable power unit which does not specifically form part of this invention. A power unit control 80 may be disposed on the frame, as shown for illustrative purposes only, or may more preferably comprise an entirely separate portable unit which is moved with the frame from one beam rack to another. The power unit control 80 has a heating element on-off switch 81 and the power unit control is connected to a power source (not shown) by power lead 82. A suitable power source may comprise a welding transformer operating on a standard 120 or 220 VAC source.

For a purpose to be described later, the apparatus further comprises a preferably cylindrical guide rod 83 (FIG. 10) over which yarn ends may pass, and one end of this guide rod is engaged by a yielding leaf spring 84 (FIG. 2A), enabling quick removal of the rod from the machine frame when desired by forcing it against the spring 84 so as to disconnect the opposite end of the rod from the frame.

The apparatus possesses another convenient feature in the form of a pair of short channel supporting members 85 at the lower forward corners of the frame FIG. 4, for the purpose of temporarily supporting elements 61 and 62 and/or the rod 83 or other similar components during periods of non-use.

FIG. 10 depicts a representation of first and second lengths of tape 86, 87, which may be employed in a manner known in the art for presetting and maintaining a proper gaging distance between adjacent yarn ends from the fresh beam to be spliced with the trailing yarn ends from the spent beam.

OPERATION

Referring again to FIG. 1, this figure shows a substantially empty beam 21 whose ends 22 have been feeding into a tufting machine at 22' after engaging the apertured header 23. It is necessary to sever the ends 22 from the spent beam and to remove the spent beam from the rack 20 and replace it with a new full beam whose fresh yarn ends must be spliced with the severed trailing ends leading into the tufting machine. Alternatively, the beam rack 20 may already have a new full beam in another stored position on the beam rack, wherein the severed ends from the spent beam would be spliced with fresh ends from this beam. Several different techniques can be employed at this point. For example, the yarn ends 22 may be engaged and clamped by one of the assemblies consisting of the comb bar 61 and coacting channel 62. If so, the ends 22 are severed below the point of clamping and the clamped trailing ends can be lifted aside or temporarily counterweighted in a manner known in the art.

According to a different procedure, the yarn ends may simply be severed, without clamping, at a convenient point above the empty beam and then bunched up into two loose groups which are temporarily hung over the tops of the rack 20 on opposite sides, preferably on hooks provided for this purpose. In this way, the loose trailing ends from the tufting machine are out of the way in an overhead position but are, of course, still engaged through the header 23 to maintain their spacing.

With this done, and the fresh beam in place on the rack 20, the splicing procedure is ready to begin. For the purpose of this description, it is assumed that the yarn ends on the fresh beam are previously taped together on the opposite sides as by adhesive tapes 86 and 87 in FIG. 10. If pre-taping is required, this is accomplished by the use of a special taping bar, not shown herein, in a procedure known to those of ordinary skill in the art. In any event, it will be understood that the purpose of the tape on the yarns ends of the fresh beam is to maintain the gage or spacing of the ends to correspond with the spacing of the tufting machine needle eyes and the guide openings in header 23.

As indicated most clearly in FIG. 10, the leading ends from the fresh beam with their tapes are pulled upwardly and over the rod 83 and then the ends 22 are laid carefully into the gaging recesses 48 between teeth 47 of the gaging bar 44. The tapes 86 and 87 are now preferably engaged below the small pins 41 for temporary anchorage. In some cases, the front face of the anchoring bar 39 may be equipped with material or teeth similar to the teeth found on cotton carding drums or hook-like material of the Velcro type to engage and hold the yarn ends 22 temporarily. This is an optional refinement.

With the ends 22 from the fresh beam thus in place, the overhead, loosely bundled, severed trailing ends 60 are released to free hanging positions and the comb bar 61, handled at opposite ends preferably by two attendants, is used to engage the yarn ends close to and below the header 23 so that the ends are gaged between the teeth 63. The comb is drawn downwardly and may be rotated or twisted on its axis to hold the ends 60 as shown in FIG. 10. These ends are brought in front of the forward gaging edge 43, as shown. The clamping channel 62 may be assembled with the comb 61 and this unit may simply hang while attached to the ends 60, and the latter are shifted into the gaging recesses 48 between the teeth 47. Therefore, at this time, an associated pair of ends consisting of one end 22 from the fresh beam and one trailing end 60 is now engaged side-by-side or over-and-under contacting relation in each of the gaging spaces 48 (FIG. 11). With all of the yarn ends so arranged, the clamp bar assembly 49 is brought into place in the manner shown in FIG. 10 and fully described previously, and locked into place by means of the spring clamp 52. The dimple stop 57 is designed such that the clamp bar assembly 49 and the gaging edge 43 (FIG. 11) are substantially in griping relation with the pairs of yarn ends at the roots of the recesses between the teeth 47.

The adjustment of the position of heating element 59 is generally performed before the spent beam splicing procedure has begun, usually no more often than once at the beginning of a run of a particular type of yarn. Adjustment is controlled by first adjusting the relationship of the yarn spacing and gaging bar 44 to the heating element 59 by bending guide members 102 (see especially FIG. 14) or by loosening bolts 45 and sliding the bar 44 through the use of the slotted adjustment holes 88 until the bar is in proper spaced relationship to the heating element 59, and then tightening bolts 45. Once the proper relationship is set, the adjustment should be the same for all yarn ends of the same gage or approximately the same gage. An additional adjustment is also available to ensure that the heating element comes into contact with the yarn ends to ensure an effective, reliable splice. This adjustment is provided by heating element support assembly 100 and spring terminals 70 which may be raised or lowered to raise or lower the position of the heating element relative to the yarn ends. Again, this adjustment should be required no more frequently than once for a given yarn gage. Other adjustment means may be used in place of the depicted and described means.

The splicing operation may now be concluded by switching the power unit switch 81 to the on position. The heat generated by the current flowing through the heating element 59 will cause the yarn ends to be heated and locally melted together, thus creating the splice. The power unit switch may then be turned off. The yarn clamp bar assembly 49 is removed and the ends 22 from the fresh beam which are now spliced securely to the trailing ends 60 leading to the tufting machine are freed from the recesses 48 and the tufting operation may commence as before. The assembly 49, when removed, may be placed in the holders 50 and the entire apparatus will appear as it does in FIG. 1 except that the beam 21 will now be a full beam and not a spent one. The frame 24 may now be disconnected and moved to the next beam rack where a beam is spent or nearly spent, and the splicing operation and procedure is repeated. The entire operation can be carried out rapidly with very little training required.

It is to be understood that the form of the invention herewith shown and described is to be taken as a preferred example of the same, and that various changes in the shape, size and arrangement of parts may become apparent to those skilled in the art, without departing from the spirit of the invention. Therefore, the scope of the invention is to be determined by having reference to the appended claims.

What is claimed is:

1. Apparatus for thermal splicing of a plurality of yarn ends from a fresh beam to a plurality of yarn ends severed from a spent beam in a carpet tufting apparatus, wherein each of said plurality of yarn ends from said fresh beam has an associated yarn end from said plurality of yarn ends from said spent beam said associated yarn ends forming a plurality of pairs of associated yarn ends, the apparatus comprising:

means for retaining said plurality of associated pairs of yarn ends in a spaced apart manner, said retaining means having means for holding a section of each of said associated pairs in contacting relation, said retaining means being of a predetermined width sufficient to retain all of said associated pairs simultaneously;

heating element means for heating said plurality of associated pairs of yarn ends to a temperature sufficient to melt said yarn ends in a substantially simultaneous manner, said heating element means extending across substantially the entire width of said retaining means, said heating element means being disposed in a substantially stationary position relative to said retaining means and said associated pairs of yarn ends such that said contacting sections of said associated pairs of yarn ends will be heated and melted together by said heating element means.

2. Apparatus as defined in claim 1 wherein said heating element means comprises an electrically conductive wire extending across said width of said retaining means, said wire being connected to biasing means for tensioning said wire in a manner such that said wire remains in said substantially stationary position during a heating and cooling thereof, said electrically conductive wire being operatively coupled to an electrical power supply.

3. Apparatus as defined in claim 2 wherein said biasing means comprises a first and second spring connected to said wire at a first and second end of said wire, each of said springs being connected between an associated end of said wire and an associated spring terminal, each of said springs applying said tensioning bias on said wire.

4. Apparatus as defined in claim 4 wherein said spring terminals are mounted on bracket means and each of said spring terminals further comprises means for adjusting a spacing of said heating element means from said bracket means.

5. Apparatus as defined in claim 4 wherein said wire is connected to said springs via means for electrically insulating said springs from said wire, and a pair of electrical leads connect opposite ends of said wire to said electrical power supply.

6. Apparatus as defined in claim 1 wherein said retaining means comprises a yarn spacing and gaging bar having a plurality of teeth extending therefrom, said plurality of teeth being spaced apart by a plurality of yarn engaging recesses disposed between adjacent teeth, said recesses being spaced apart at predetermined distances from adjacent recesses.

7. Apparatus as defined in claim 6 wherein said yarn spacing and gaging bar and said heating element means are mounted on a bracket means, and said bracket means is removably mountable on a beam rack holding said fresh beam in position.

8. Apparatus as defined in claim 7 wherein said retaining means further comprises a clamp bar assembly, said clamp bar assembly having a length sufficient to span said plurality of teeth and recesses of said yarn spacing and gaging bar, said clamp bar assembly having clamping means for removably clamping said bar over said plurality of recesses, said clamp bar assembly being adapted to assist in retaining said associated pairs of yarn ends in said recesses by providing a barrier between adjacent teeth of said yarn gaging bar.

9. Apparatus as defined in claim 8 wherein said heating element means comprises an electrically conductive wire extending across said width of said yarn spacing and gaging bar, said wire being connected to biasing means for tensioning said wire in a manner such that said wire remains in said substantially stationary position during heating and cooling thereof, said electrically conductive wire being operatively coupled to an electrical power supply.

10. Apparatus as defined in claim 10 wherein said biasing means comprises a first and second spring connected to said wire at opposite ends of said wire, each of said springs being connected between an associated end of said wire and an associated spring terminal, each of said springs applying a tensioning bias on said wire.

11. Apparatus as defined in claim 10 wherein said spring terminals are mounted on said bracket means, and each of said spring terminals further comprises means for adjusting a spacing of said heating element means from said bracket means.

12. Apparatus as defined in claim 11 wherein said wire is connected to said springs via means for electrically insulating said springs from said wire, and a pair of electrical leads connect opposite ends of said wire to said electrical power supply.

13. Apparatus as defined in claim 7 further comprising means for adjusting a spacing between said yarn spacing and gaging bar and said heating element means.

14. Apparatus for thermal splicing of a plurality of associated pairs of yarn ends employed in the tufting of carpet comprising:
   means for retaining said plurality of associated pairs of yarn ends in a gaged, spaced apart manner, said retaining means extending across substantially an entire width of a beam of yarn ends;
   heating means for simultaneously heating said plurality of associated pairs of yarn ends, said heating means extending along substantially an entire length of said retaining means; and wherein
   said heating means further comprises means for maintaining a heating element in a substantially fixed position relative to said plurality of associated pairs of yarn ends retained in said retaining means when said heating element is heating said plurality of associated pairs of yarn ends, in order to effect a substantially simultaneous heating and splicing of said pairs of yarn ends.

15. Apparatus as defined in claim 15 further comprising a bracket having said retaining means and said heating means mounted thereon.

16. Apparatus as defined in claim 15 wherein said position maintaining means comprises biasing means for tensioning said heating element throughout a predetermined heating and cooling cycle, said biasing means being connected to said heating element and to at least one terminal, said at least one terminal being mounted on said bracket at a predetermined location.

17. Apparatus as defined in claim 16 wherein said bracket is attached to frame means for removably attaching said apparatus to a beam rack, said beam rack being adapted to retain a fresh beam of yarn in position for use in said tufting of carpet.

18. Apparatus as defined in claim 17 wherein said heating element comprises an electrically conductive wire extending across substantially an entire width of said retaining means.

19. Apparatus as defined in claim 18 wherein said biasing means comprises a first spring connected at one end to said heating element and connected at another end to said at least one terminal.

20. Apparatus as defined in claim 19 wherein said terminal comprises means for adjusting a spacing between said heating element and said bracket.

21. Apparatus as defined in claim 20 wherein said biasing means further comprises a second spring connected at one end to an opposite end of said heating element as said first spring, said second spring further being connected at its other end to a second terminal.

22. Apparatus as defined in claim 21 wherein said retaining means comprises a yarn spacing and gaging bar having a plurality of teeth extending therefrom and a plurality of yarn engaging recesses disposed between adjacent teeth.

23. Apparatus as defined in claim 22 wherein said retaining means further comprises a clamp bar means for clamping onto said yarn spacing and gaging bar for providing a barrier over each of said plurality of recesses to assist in retaining said plurality of associated pairs of yarn ends.

* * * * *